(12) United States Patent
Watanabe

(10) Patent No.: US 10,848,675 B2
(45) Date of Patent: Nov. 24, 2020

(54) IMAGE BLUR CORRECTION APPARATUS, CAMERA BODY, IMAGE BLUR CORRECTION METHOD, AND STORAGE MEDIUM

(71) Applicant: CANON KABUSHIKI KAISHA, Tokyo (JP)

(72) Inventor: Takeshi Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/240,979

(22) Filed: Jan. 7, 2019

(65) Prior Publication Data
US 2019/0222735 A1 Jul. 18, 2019

(30) Foreign Application Priority Data

Jan. 15, 2018 (JP) ................................ 2018-004466

(51) Int. Cl.
*H04N 5/232* (2006.01)

(52) U.S. Cl.
CPC ....... *H04N 5/2327* (2013.01); *H04N 5/23258* (2013.01); *H04N 5/23267* (2013.01); *H04N 5/23287* (2013.01)

(58) Field of Classification Search
CPC ............ H04N 5/2327; H04N 5/23258; H04N 5/23287; H04N 5/23267
USPC .................................................. 348/208.99
See application file for complete search history.

(56) References Cited

U.S. PATENT DOCUMENTS

| 2014/0111661 | A1 | 4/2014 | Watanabe et al. | |
|---|---|---|---|---|
| 2015/0281581 | A1* | 10/2015 | Sakurai | H04N 5/23287 348/208.2 |
| 2015/0281582 | A1* | 10/2015 | Sakurai | H04N 5/23287 348/208.2 |
| 2017/0289430 | A1* | 10/2017 | Seki | H04N 5/23261 |
| 2018/0115697 | A1* | 4/2018 | Kawada | H04N 5/23216 |

FOREIGN PATENT DOCUMENTS

JP 2015-194711 A 11/2015

* cited by examiner

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

There is provided an image blur correction apparatus including a communication device configured to communicate with a correction amount determination apparatus that determines a second correction amount for correcting image blur of an image capturing apparatus based on shake occurring in the image capturing apparatus. A reception unit receives the second correction amount from the correction amount determination apparatus via the communication device. Based on the second correction amount, a control unit controls a second correction member configured to correct the image blur. An acquisition unit acquires a correction error of the second correction member caused by a communication delay of the second correction amount in the communication device. Based on the correction error, a third correction unit corrects the image blur by image processing to reduce the correction error.

8 Claims, 12 Drawing Sheets

IMAGE BLUR CORRECTION APPARATUS, CAMERA BODY, IMAGE BLUR CORRECTION METHOD, AND STORAGE MEDIUM

BACKGROUND OF THE INVENTION

Field of the Invention

The present invention relates to an image blur correction apparatus, a camera body, an image blur correction method, and a storage medium.

Description of the Related Art

Technologies for correcting image blur caused by shake applied to an image capturing apparatus are widespread. As a method for correcting image blur, there is optical image blur correction that corrects image blur by driving a correction optical system, which is part of the optical system, in a plane perpendicular to the optical axis according to the detected shake. Also, as another method, there is image sensor shift-type image blur correction that corrects image blur by driving the image sensor in a plane perpendicular to the optical axis according to the detected shake.

Also, in recent years, technologies have emerged that expand the range over which image blur correction is possible, by driving these plurality of correction members in a coordinated manner, enabling correction of even large camera shake of the sort that could not be properly corrected with only one correction member. Japanese Patent Laid-Open No. 2015-194711 discloses a technology that divides an image blur correction signal into a high frequency band and a low frequency band, and performs correction of high frequency image blur with one correction member and correction of low frequency image blur with another correction member.

The image capturing apparatus of Japanese Patent Laid-Open No. 2015-194711 calculates the image blur correction signal based on the output of an angular velocity sensor that is mounted in an interchangeable lens, and divides the calculated image blur correction signal. The image capturing apparatus then operates the image blur correction apparatuses of the interchangeable lens and the camera body in a coordinated manner, by transmitting one of the divided image blur correction signals to the camera body via a communication unit. At this time, a phase delay occurs in the image blur correction on the camera body side due to a communication delay between the interchangeable lens and the camera body, and the image blur correction effect diminishes. As a countermeasure, a method has been proposed that involves dividing the image blur correction signal calculated by the interchangeable lens into a high frequency band and a low frequency band, transmitting the low frequency component which is less susceptible to the effect of a phase delay to the camera body, and correcting low frequency image blur with the image blur correction apparatus of the camera body. However, even if the image blur correction signal in the low frequency band is less susceptible to the effect of a phase delay, the extent to which the signal is affected will be dependent on the amount of communication delay, and thus the effect still remains depending on the magnitude of the communication delay. Accordingly, in order to reduce the effect of the communication delay, a high-speed communication cycle is required between the interchangeable lens and the camera body, which is problematic in that a high-speed CPU is required and power consumption increases due to the increased communication frequency. Also, if a cutoff frequency for dividing an image blur correction signal is not set appropriately according to the communication delay, there will be an inevitable reduction in the image blur correction effect, and thus system design is difficult.

SUMMARY OF THE INVENTION

The present invention has been made in consideration of such circumstances, and provides a technology for reducing a correction error, which is caused by a communication delay of a correction amount, in an image blur correction apparatus that corrects image blur using a correction amount received from another apparatus.

According to a first aspect of the present invention, there is provided an image blur correction apparatus including a communication device configured to communicate with a correction amount determination apparatus that determines a second correction amount for correcting image blur of an image capturing apparatus based on shake occurring in the image capturing apparatus, the image blur correction apparatus comprising one or more processors and a memory storing a program which, when executed by the one or more processors, causes the image blur correction apparatus to function as: a reception unit configured to receive the second correction amount from the correction amount determination apparatus via the communication device; a control unit configured to, based on the second correction amount, control a second correction member configured to correct the image blur; an acquisition unit configured to acquire a correction error of the second correction member caused by a communication delay of the second correction amount in the communication device; and a third correction unit configured to, based on the correction error, correct the image blur by image processing to reduce the correction error.

Further features of the present invention will become apparent from the following description of exemplary embodiments with reference to the attached drawings.

DESCRIPTION OF THE EMBODIMENTS

Figure 1:
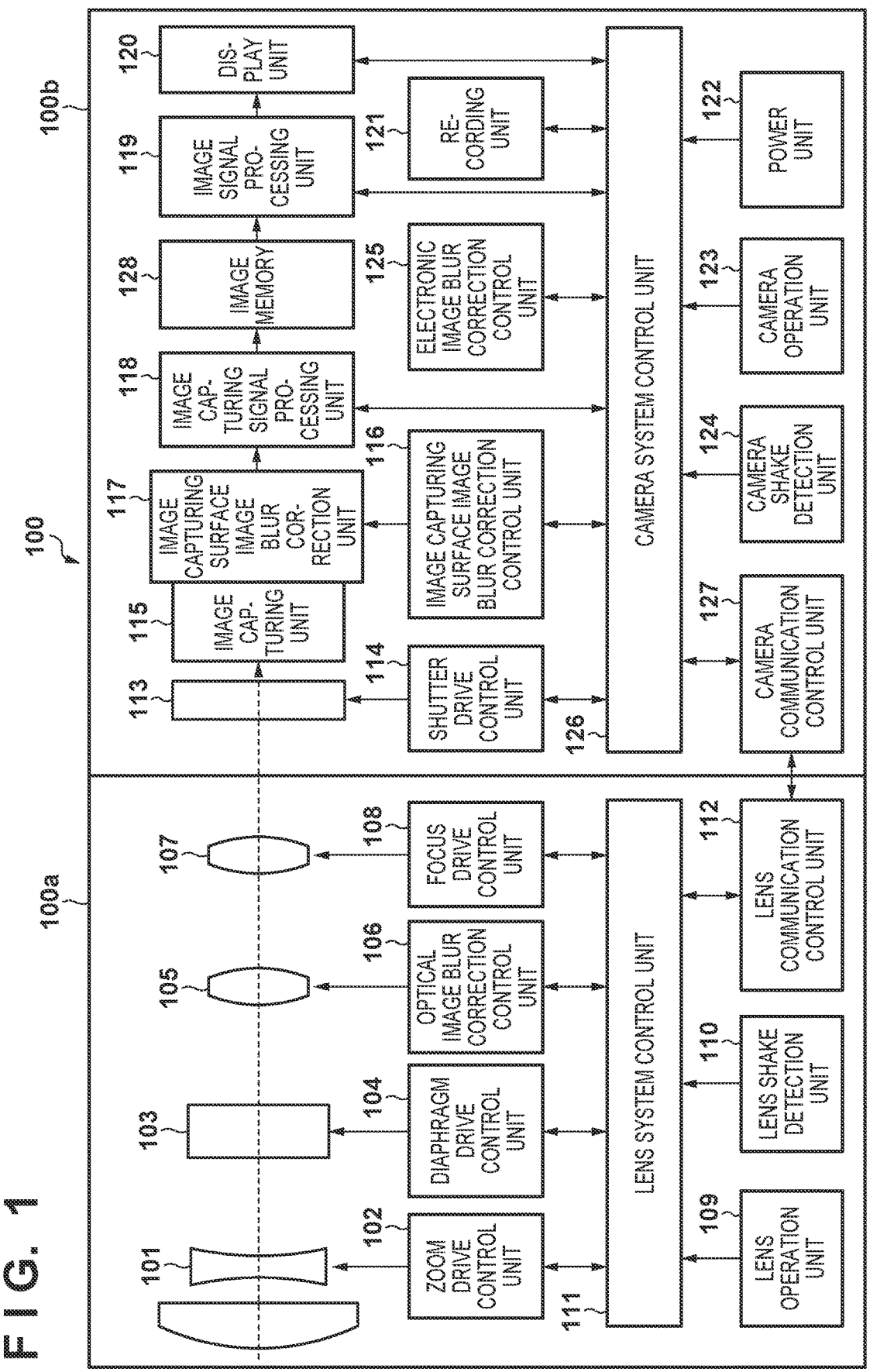
FIG. 1 is a block diagram showing the configuration of an image capturing apparatus 100 including a correction amount determination apparatus and an image blur correction apparatus.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

In the following embodiments, vibration that is applied to an image capturing apparatus is referred to as "shake", and the effect on a captured image that occurs as a result of shake applied to the image capturing apparatus is referred to as "image blur".

First Embodiment

FIG. 1 is a block diagram showing the configuration of an image capturing apparatus 100 that includes a correction amount determination apparatus and an image blur correction apparatus. The image capturing apparatus 100 is an interchangeable-lens digital camera capable of shooting still images and moving images. However, the present embodiment is not limited to an interchangeable-lens digital camera, and the present embodiment can be applied to various types of image capturing apparatuses.

The image capturing apparatus 100 is constituted by an interchangeable lens 100a and a camera body 100b, with the interchangeable lens 100a being mounted for use to the camera body 100b. A zoom unit 101 of the interchangeable lens 100a includes a zoom lens that performs magnification. A zoom drive control unit 102 performs drive control of the zoom unit 101. A diaphragm unit 103 has a function of a diaphragm. A diaphragm drive control unit 104 performs drive control of the diaphragm unit 103. An image blur correction unit 105 is provided with an image blur correction lens such as a shift lens or the like (hereinafter, also referred to as a "correction lens" or "OIS"). An image blur correction lens is movable in a direction perpendicular to the optical axis of the image capturing apparatus 100. An optical image blur correction control unit 106 performs drive control of the image blur correction unit 105. A focus unit 107 includes a focus lens that performs focus adjustment and forms an object image. A focus drive control unit 108 performs drive control of the focus unit 107.

A lens operation unit 109 is an operation unit that is used by a user to operate the interchangeable lens 100a. A lens shake detection unit 110 detects the amount of shake that is applied to (that occurs in) the image capturing apparatus 100 or the interchangeable lens 100a, and outputs a detection signal to a lens system control unit 111. The lens system control unit 111 is provided with a CPU (central processing unit), and performs overall control of the drive control units and the correction control unit of the interchangeable lens 100a and controls the entire interchangeable lens 100a. The lens system control unit 111 communicates with a camera communication control unit 127 of the camera body 100b, via a lens communication control unit 112. That is, in a state where the interchangeable lens 100a is mounted and electrically connected to the camera body 100b, the interchangeable lens 100a and the camera body 100b communicate with each other, via the lens communication control unit 112 and the camera communication control unit 127.

Next, the camera body 100b will be described. The camera body 100b is provided with a shutter unit 113. A shutter drive control unit 114 performs drive control of the shutter unit 113. An image capturing unit 115 is provided with an image sensor, and photoelectrically converts an optical image formed by light that has passed through each lens group and outputs an electrical signal. The image sensor of the image capturing unit 115 is movable in a direction perpendicular to the optical axis of the image capturing apparatus 100. An image capturing surface image blur correction unit 117 is provided with an image capturing surface image blur correction unit (hereinafter, also referred to as an "image capturing surface correction unit" or "IIS") that moves the image sensor of the image capturing unit 115 to correct image blur. An image capturing surface image blur correction control unit 116 performs drive control of the image capturing surface image blur correction unit 117. An image capturing signal processing unit 118 converts the electrical signal output by the image capturing unit 115 into a video signal, and temporarily holds the video signal in an image memory 128. An image signal processing unit 119 processes the video signal held in the image memory 128 according to the application. For example, the image signal processing unit 119 changes a clipping position of the video signal according to the correction amount of an electronic image blur correction control unit 125. The electronic image blur correction control unit 125 controls image blur correction by clipping images. Note that the clipping position of an image may be changed through coordinate transformation. Changing of the clipping position of an image through coordinate transformation is well-known, and thus a detailed description is omitted here, but may be performed using affine transformation, or information of one pixel may be acquired using interpolation from the information of a plurality of pixels. In the case where the image signal processing unit 119 performs image blur correction, processing by the image signal processing unit 119 cannot be started until the computation of the correction amount is completed. Thus, the image memory 128 is required in order to perform banking control for storing the video signal.

A display unit 120 performs image display as needed, based on the signal output by the image signal processing unit 119. A recording unit 121 stores various data such as video information. A power unit 122 supplies power to the entire apparatus according to the application. A camera operation unit 123 is an operation unit that is used by a user to operate the camera body 100b, and outputs an operation signal to a camera system control unit 126. A camera shake detection unit 124 detects the amount of shake that is applied to (that occurs in) the image capturing apparatus 100 or the camera body 100b, and outputs a detection signal to the camera system control unit 126. The camera system control unit 126 is provided with a CPU, and performs overall control of the entire camera body 100b. The camera system control unit 126 communicates with the lens communication control unit 112 of the interchangeable lens 100a via the camera communication control unit 127. That is, in a state where the interchangeable lens 100a is mounted and electrically connected to the camera body 100b, the interchangeable lens 100a and the camera body 100b communicate with each other, via the lens communication control unit 112 and the camera communication control unit 127.

Next, the general operations of the image capturing apparatus 100 will be described. The lens operation unit 109 and the camera operation unit 123 include an image blur correction switch with which ON/OFF of image blur correction can be selected. When a user operates the image blur correction switch to select ON, the lens system control unit 111 and the camera system control unit 126 instruct the optical image blur correction control unit 106, the image capturing surface image blur correction control unit 116 and the electronic image blur correction control unit 125 to perform an image blur correction operation. The image blur correction control units perform control of image blur correction until an OFF instruction of the image blur correction is given.

Also, the camera operation unit 123 includes an image blur correction mode switch with which a first mode and a second mode can be selected in relation to image blur correction. The first mode is a mode in which image blur correction is performed through a combination of optical image blur correction and image capturing surface image blur correction. The second mode is a mode in which image blur correction is performed by using a combination of optical image blur correction, image capturing surface image blur correction, and electronic image blur correction. In the case where the first mode is selected, a wider correction angle can be realized, by performing correction through coordinating optical image blur correction and image capturing surface image blur correction, enabling large shake to be corrected. The readout position of the image capturing unit 115 is fixed, and wider angle shooting can be supported by expanding the readout range as a result. Also, in the case where the second mode is selected, the clipping range of the video signal by the image signal processing unit 119 is narrowed, but larger shake can be handled by changing the clipping position according to the amount of image blur correction.

The camera operation unit 123 includes a shutter release button configured such that a first switch (SW1) and a second switch (SW2) turn on in order according to the amount by which the shutter release button is pressed. SW1 turns on when the user presses the shutter release button approximately halfway, and SW2 turns on when the user presses the shutter release button all the way. As a result of SW1 turning on, the focus drive control unit 108 drives the focus unit 107 to perform focus adjustment, and the diaphragm drive control unit 104 drives the diaphragm unit 103 to set the proper exposure. As a result of SW2 turning on, image data obtained from the optical image exposed by the image capturing unit 115 is stored in the recording unit 121.

Also, the camera operation unit 123 includes a moving image recording switch. The image capturing apparatus 100 starts moving image shooting after the moving image recording switch is pressed, and ends recording when the user presses the moving image recording switch again during recording. When the user operates the shutter release button to turn on SW1 and SW2 during moving image shooting, processing for acquiring and recording a still image during moving image recording is executed. Also, the camera operation unit 123 includes a playback mode selection switch with which a playback mode can be selected. In the case where the playback mode is selected through operation of the playback mode selection switch, the image capturing apparatus 100 stops the image blur correction operation.

Figure 2:
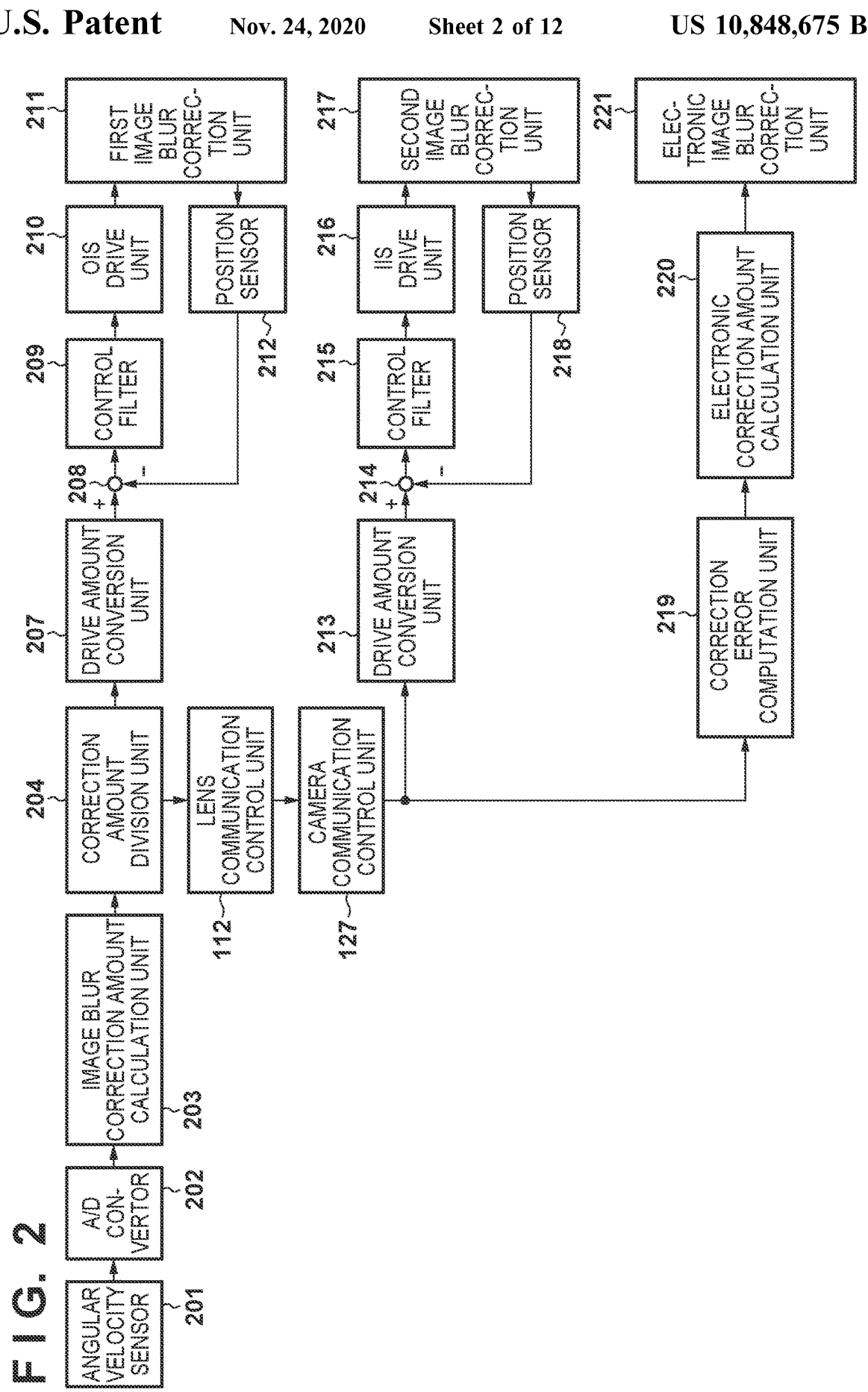
FIG. 2 is a block diagram illustrating image blur correction control according to a first embodiment.

Next, image blur correction control that is executed by the lens system control unit 111 and the camera system control unit 126 will be described, with reference to FIG. 2. FIG. 2 is a block diagram illustrating control for driving a first image blur correction unit 211 and a second image blur correction unit 217 to perform image blur correction based on information relating to shake that is applied to the image capturing apparatus 100. Note that, as described later, in the image capturing apparatus 100, electronic image blur correction by an electronic image blur correction unit 221 is also performed in order to reduce the correction error of the second image blur correction unit 217.

In FIG. 2, an angular velocity sensor 201 and an A/D convertor 202 are included in the lens shake detection unit 110. An image blur correction amount calculation unit 203 and a correction amount division unit 204 are implemented by the lens system control unit 111. A drive amount conversion unit 207, a subtractor 208, a control filter 209, an OIS drive unit 210 and a position sensor 212 are included in the optical image blur correction control unit 106. The first image blur correction unit 211 corresponds to the image blur correction unit 105. A drive amount conversion unit 213, a subtractor 214, a control filter 215, an IIS drive unit 216 and a position sensor 218 are included in the image capturing surface image blur correction control unit 116. The second image blur correction unit 217 corresponds to the image capturing surface image blur correction unit 117. A correction error computation unit 219, an electronic correction amount calculation unit 220 and the electronic image blur correction unit 221 are implemented by the electronic image blur correction control unit 125 and the camera system control unit 126.

In the present embodiment, the image capturing apparatus 100 acquires the correction amount for image blur correction using the angular velocity sensor 201 and drives the first image blur correction unit 211. Also, the image capturing apparatus 100 transmits the correction amount for the second image blur correction unit 217 from the interchangeable lens 100a to the camera body 100b via the lens communication control unit 112 and the camera communication control unit 127, and drives the second image blur correction unit 217. That is, in the image blur correction system of the present embodiment, the interchangeable lens 100a operates as the master and the camera body 100b operates as the slave.

The angular velocity sensor 201 detects the angular velocity of shake that is applied to the image capturing apparatus 100, and outputs a voltage that depends on the detected angular velocity. The output voltage of the angular velocity sensor 201 is converted into digital data by the A/D convertor 202 and acquired as angular velocity data, and the angular velocity data is supplied to the image blur correction amount calculation unit 203. The series of processing from acquisition of the angular velocity data to driving of the image blur correction units is repeatedly performed at a sufficiently high-speed cycle relative to 1 to 20 Hz, which is the frequency band of camera shake, and is repeatedly performed at a cycle of 1000 Hz, for example.

The image blur correction amount calculation unit 203 computes the correction amount for correcting image blur that occurs due to shake that is applied to the image capturing apparatus 100. Note that the image capturing apparatus 100 is provided with two image blur correction units, namely, the first image blur correction unit 211 and the second image blur correction unit 217. However, the correction amount that is calculated by the image blur correction amount calculation unit 203 is a correction amount for correcting image blur of the entire image capturing apparatus 100, rather than a correction amount for each of the two image blur correction units.

Figure 3:
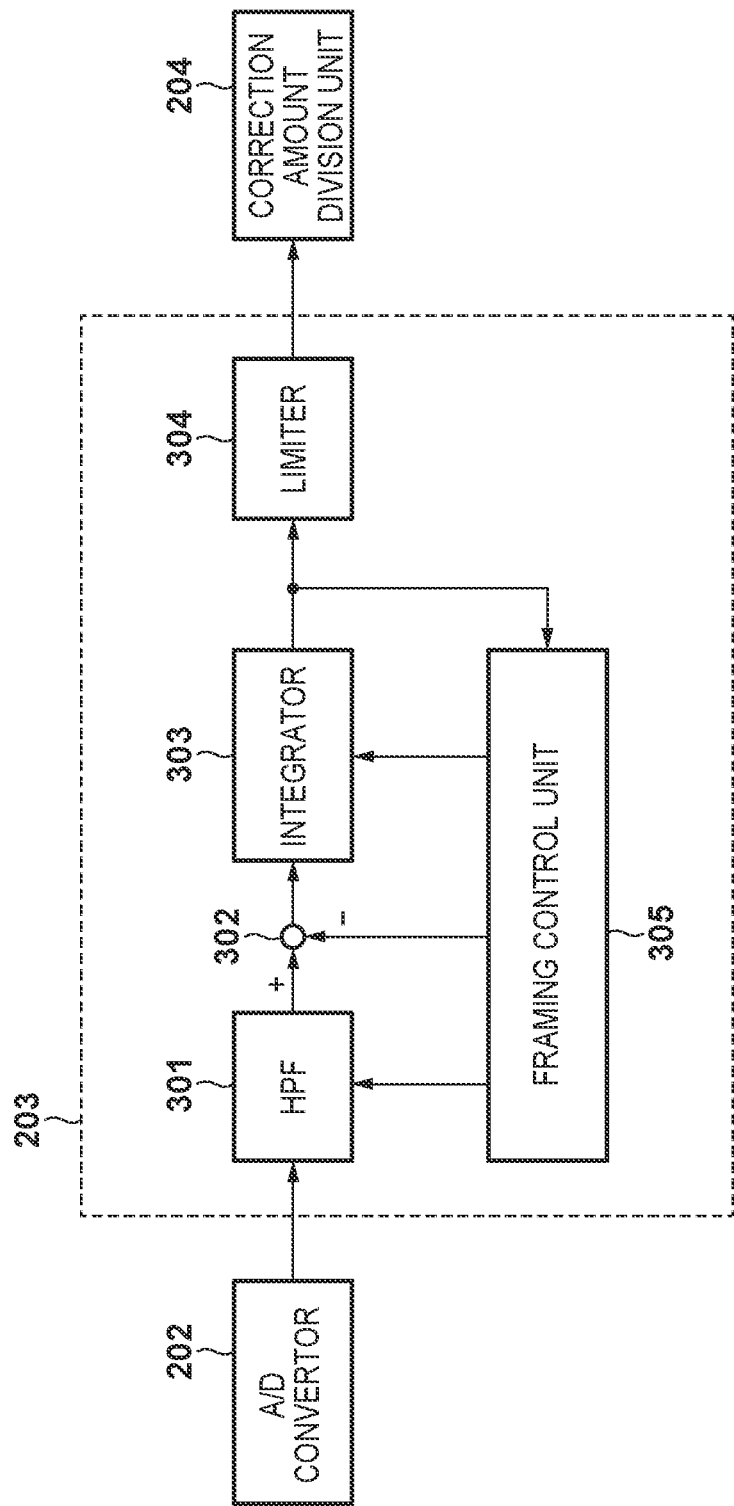
FIG. 3 is a block diagram illustrating an image blur correction amount calculation unit 203 in detail.

FIG. 3 is a block diagram illustrating the image blur correction amount calculation unit 203 in detail. A HPF 301

(high-pass filter) is used in order to remove the DC component and the low frequency component of the angular velocity data detected by the A/D convertor 202. Angular velocity data that has passed through the HPF 301 is converted into angular displacement data through first-order integration performed in an integrator 303. The integration computation that is performed here is imperfect integration in order to prevent saturation, and is computed using a commonly known first-order LPF (low-pass filter). The angular displacement data calculated by the integrator 303 is supplied to a framing control unit 305 and a limiter 304. The limiter 304 applies a restriction to the angular displacement data such that the first image blur correction unit 211 and the second image blur correction unit 217 do not hit the end of the movable range. The angular displacement data to which the restriction is applied by the limiter 304 is output as the output of the image blur correction amount calculation unit 203, that is, the image blur correction amount of the captured image. Note that the image blur correction amount (angular displacement data) that is computed by the image blur correction amount calculation unit 203 is the total value of the correction amounts of the first image blur correction unit 211 and the second image blur correction unit 217. Thus, the limit value that is set in the limiter 304 is the displacement amount obtained by totaling the control range of the first image blur correction unit 211 and the control range of the second image blur correction unit 217.

The framing control unit 305 determines whether an operation intended by the user such as panning or tilting has been performed, and performs control to return the angular displacement data to the center. In other words, the framing control unit 305 removes the shake component caused by framing of the image capturing apparatus 100 intended by the user from the angular velocity (angular displacement data acquired with the A/D convertor 202) detected by the angular velocity sensor 201. Image blur caused by camera shake can thereby be corrected, while performing framing intended by the user. Specifically, a predetermined threshold value further inside the control end of the angular displacement data provided in the limiter 304 is provided, and it is determined that panning has been performed in the case where the angular displacement data that is output by the integrator 303 exceeds the threshold value. In the case where it is determined that panning has been performed, the framing control unit 305 restricts the angular velocity data by setting a high cutoff frequency of the HPF 301 and removing much of the low frequency component. Alternatively, a configuration may be adopted in which the output of the integrator 303 returns to the center, as a result of the framing control unit 305 subtracting an offset from the angular velocity data that is input to the integrator 303. Alternatively, the framing control unit 305 may perform control such that the output of the integrator 303 returns to the center by setting a high cutoff frequency for the LPF computation that is performed by the integrator 303. Performing control in this way enables control to be performed such that the first image blur correction unit 211 and the second image blur correction unit 217 remain within the movable range, even in the case where shake that the user intended, such as panning or tilting, occurs.

Returning to FIG. 2, the correction amount division unit 204 determines a first correction amount that is for controlling the first image blur correction unit 211 and a second correction amount that is for controlling the second image blur correction unit 217. Specifically, the correction amount division unit 204 divides the image blur correction amount of the entire apparatus calculated by the image blur correction amount calculation unit 203 into the first correction amount and the second correction amount. The correction amount division unit 204 outputs the first correction amount to the drive amount conversion unit 207, and outputs the second correction amount to the lens communication control unit 112.

Figure 4A:
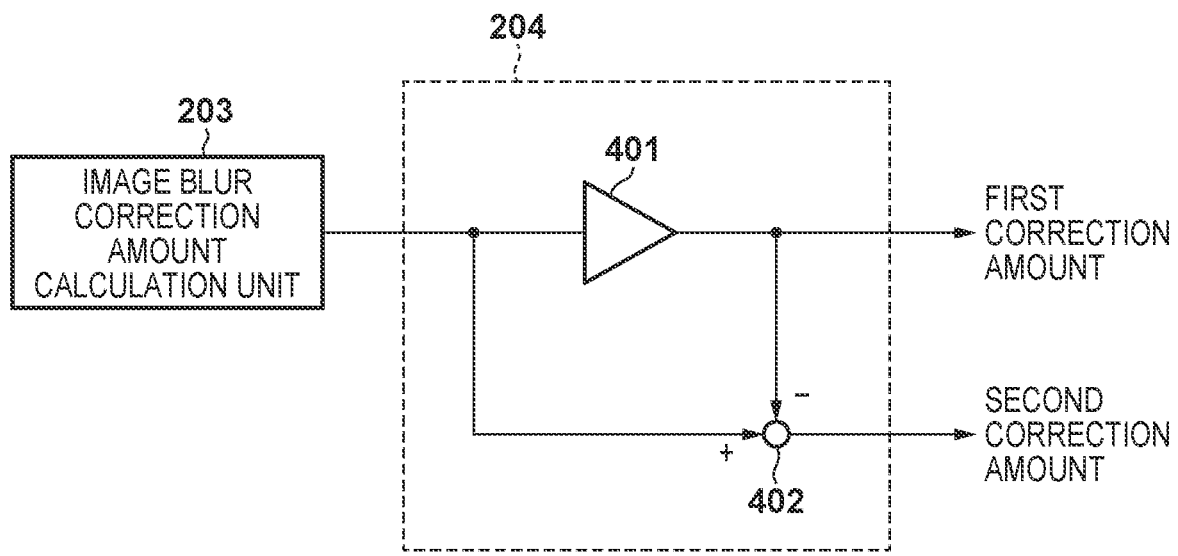
FIGS. 4A and 4B are block diagrams showing an exemplary configuration of a correction amount division unit 204.
Figure 4B:
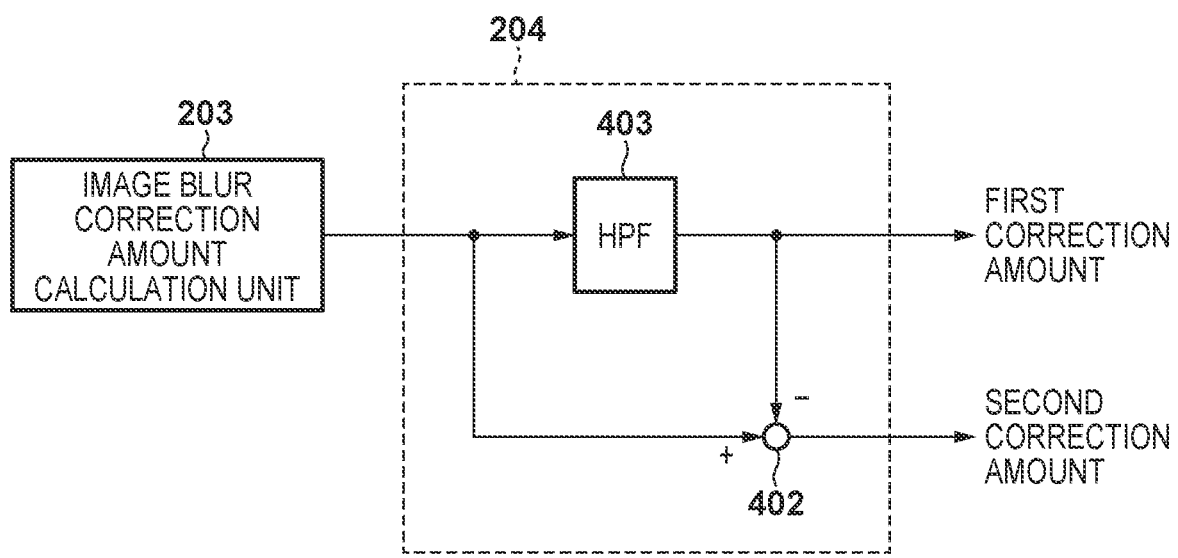

FIGS. 4A and 4B are block diagrams showing an exemplary configuration of the correction amount division unit 204. In FIG. 4A, a multiplier 401 multiplies the image blur correction amount calculated by the image blur correction amount calculation unit 203 by a predetermined magnification K1 and outputs the first correction amount. Here, K1 is a magnification satisfying:

$$0 \leq K1 \leq 1 \tag{1}$$

The image blur correction amount obtained through multiplication with the predetermined magnification K1 by the multiplier 401 is the correction amount for when performing image blur correction with the first image blur correction unit 211. Also, a subtractor 402 calculates a second correction amount that is used when performing image blur correction with the second image blur correction unit 217, by subtracting the first correction amount from the image blur correction amount calculated by the image blur correction amount calculation unit 203. As a result of such an operation, the image blur correction amount calculated by the image blur correction amount calculation unit 203 is divided such that the correction amount of image blur correction of the entire apparatus is obtained when the first correction amount and the second correction amount are added together.

FIG. 4A shows an example in which the image blur correction amount is divided by a predetermined ratio, but a configuration may be adopted in which the image blur correction amount is divided by frequency band. FIG. 4B shows an exemplary configuration of the correction amount division unit 204 in the case of dividing the image blur correction amount by frequency band. A HPF 403 passes only the high frequency band of the image blur correction amount calculated by the image blur correction amount calculation unit 203, and this high frequency component is calculated as the first correction amount. The subtractor 402 extracts the second correction amount (low frequency component), by subtracting the first correction amount (high frequency component) from the image blur correction amount calculated by the image blur correction amount calculation unit 203.

Returning to FIG. 2, the drive amount conversion unit 207 converts the first correction amount output by the correction amount division unit 204 into a movement amount for appropriately performing image blur correction with the first image blur correction unit 211, and outputs the movement amount as a drive target position. The position sensor 212 detects position information of the first image blur correction unit 211. The subtractor 208 derives deviation data, by subtracting the position information of the first image blur correction unit 211 from the drive target position. The deviation data is input to the control filter 209, where various signal processing such as gain amplification and phase correction is performed, and the obtained data is supplied to the OIS drive unit 210. The OIS drive unit 210 drives the first image blur correction unit 211 in accordance with the output of the control filter 209. The correction optical system thereby moves in a direction perpendicular to the optical axis. The position information of the first image blur correction unit 211 that has moved is again detected with the position sensor 212 and the next deviation data is calculated.

That is, a feedback loop is formed, and the first image blur correction unit 211 is controlled such that the difference between the drive target position and the position information decreases. The correction optical system can thereby be driven so as to track the drive target position.

The second correction amount calculated by the correction amount division unit 204 is transmitted to the camera body 100b via the lens communication control unit 112 and the camera communication control unit 127. The drive amount conversion unit 213 converts the second correction amount received from the interchangeable lens 100a into a movement amount for appropriately performing image blur correction with the second image blur correction unit 217, and outputs the movement amount as a drive target position. The position sensor 218 detects the position information of the second image blur correction unit 217. The subtractor 214 derives deviation data, by subtracting the position information of the second image blur correction unit 217 from the drive target position. The deviation data is input to the control filter 215, where various signal processing such as gain amplification and phase correction is performed, and the obtained data is supplied to the IIS drive unit 216. The IIS drive unit 216 drives the second image blur correction unit 217 in accordance with the output of the control filter 215. The image capturing surface thereby moves in a direction perpendicular to the optical axis.

In this way, the first image blur correction unit 211 and the second image blur correction unit 217 operate in a coordinated manner so as to share correction of image blur corresponding to shake of the entire apparatus. As a result of such coordinated operation, the range over which image blur correction is possible can be expanded.

The correction error computation unit 219 computes the correction error of the second image blur correction unit 217 caused by a communication delay of the second correction amount in the lens communication control unit 112 and the camera communication control unit 127. The correction error computation unit 219 will be described in detail later.

The electronic correction amount calculation unit 220 calculates the correction amount for performing image blur correction with the electronic image blur correction unit 221, based on the correction error calculated by the correction error computation unit 219. The electronic image blur correction unit 221 performs electronic image blur correction for correcting image blur between the frames of a moving image by changing the clipping position of the captured image (image to be corrected). The effect of the communication delay can be mitigated, by controlling the electronic image blur correction unit 221 according to the correction error of the second image blur correction unit 217 caused by the communication delay.

Here, the effect of communication of the correction amount between the interchangeable lens 100a and the camera body 100b will be described. The correction amount calculated in the interchangeable lens 100a is transmitted to the camera body 100b by communication between the interchangeable lens 100a and the camera body 100b. At this time, a phase delay occurs in the control of the camera body 100b, due to a communication delay, that is, the time period required for communication (and the time period from when communication is received until the next control of the camera body 100b). Here, a phase delay θ when the communication delay is given as ΔT can be calculated as follows.

$$G(s) = e^{-\frac{\Delta T}{2}s} \quad (2)$$

$$G(jw) = e^{-jw\frac{\Delta T}{2}} = \cos w\frac{\Delta T}{2} - j\sin w\frac{\Delta T}{2}$$

$$\theta = \angle G(jw) = -\tan^{-1}\frac{\sin w\frac{\Delta T}{2}}{\cos w\frac{\Delta T}{2}} = -w\frac{\Delta T}{2} \times \frac{180}{\pi}[\text{degree}]$$

Figure 6:
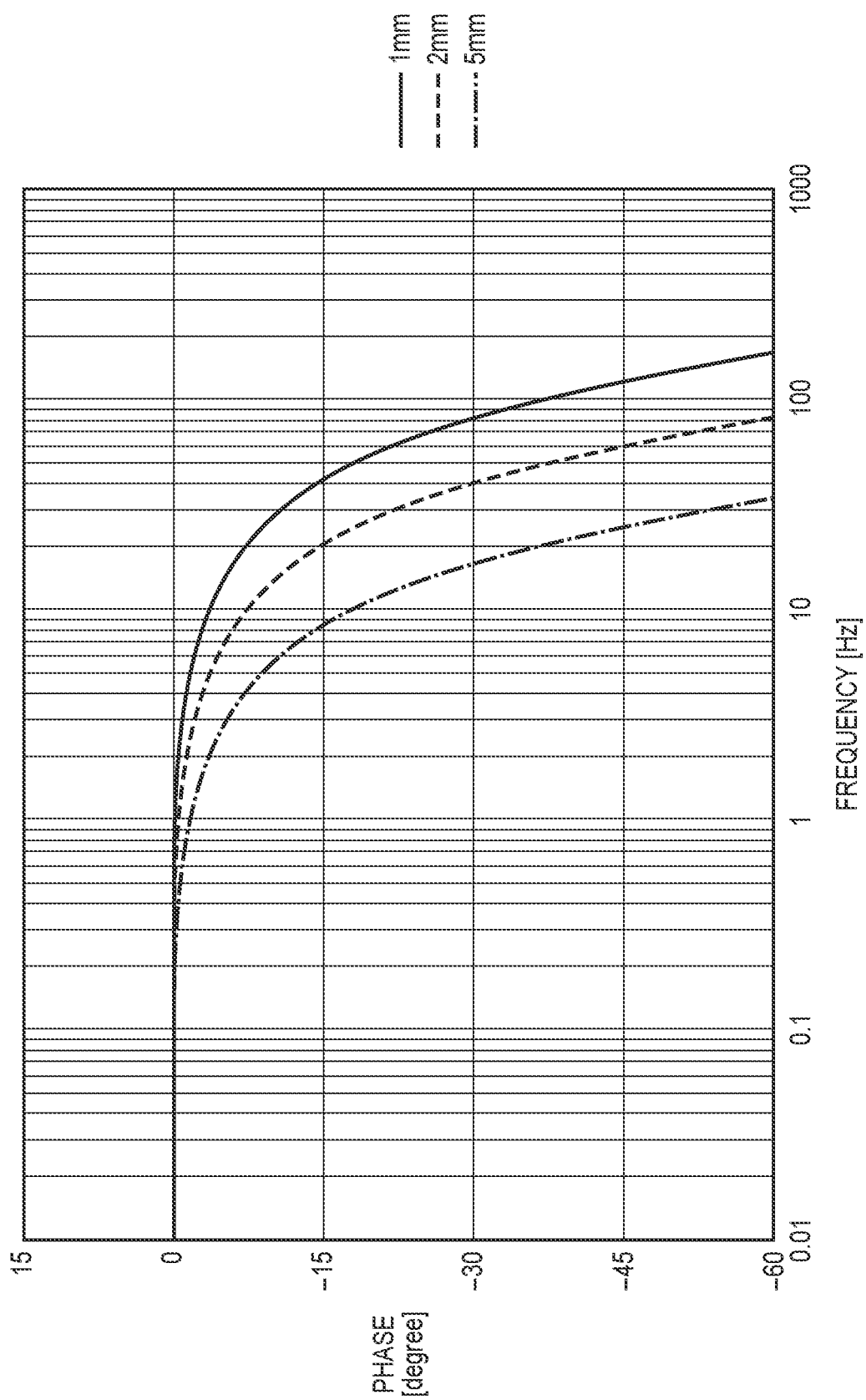
FIG. 6 is a graph showing frequency characteristics of a phase delay of a correction amount.
Figure 7:
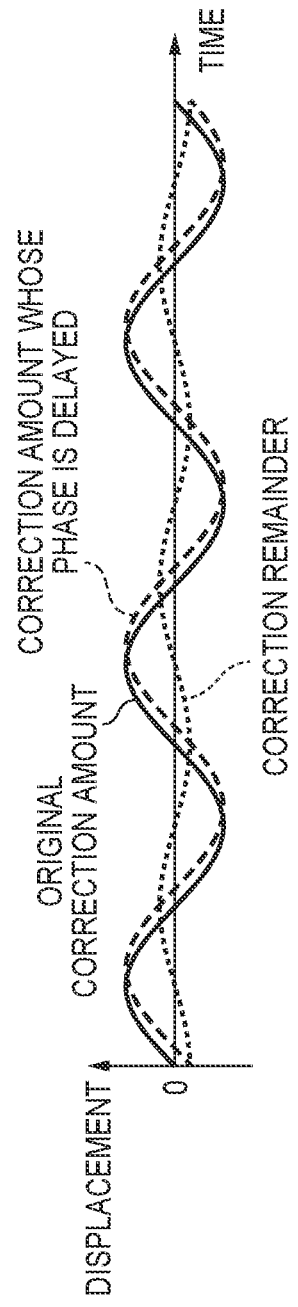
FIG. 7 is a graph showing a correction remainder caused by a phase delay of the correction amount.

As an example, when a communication delay ΔT is set to 1 ms, 2 ms and 5 ms, the phase delay θ for each frequency will, based on equation (2), have the frequency characteristics shown in FIG. 6. Also, FIG. 7 shows the phase delay that occurs in the correction amount when the correction amount is given as a 10 Hz sine wave and the communication delay ΔT is given as 5 ms. Also, FIG. 7 represents image blur that remains in the image without being corrected (hereinafter, also called "correction remainder"), when image blur correction is performed in accordance with a correction amount in which the phase delay occurs. In this way, the communication delay is a factor causing a drop in the image blur correction effect.

In view of this, in the present embodiment, the above-mentioned correction remainder (correction error) that occurs on the slave side (second image blur correction unit 217 of the camera body 100b) is calculated on the slave side (camera body 100b). The slave side then controls a third image blur correction unit (electronic image blur correction unit 221) so as to cancel out (reduce) the correction error, based on the calculated correction error.

Figure 5:
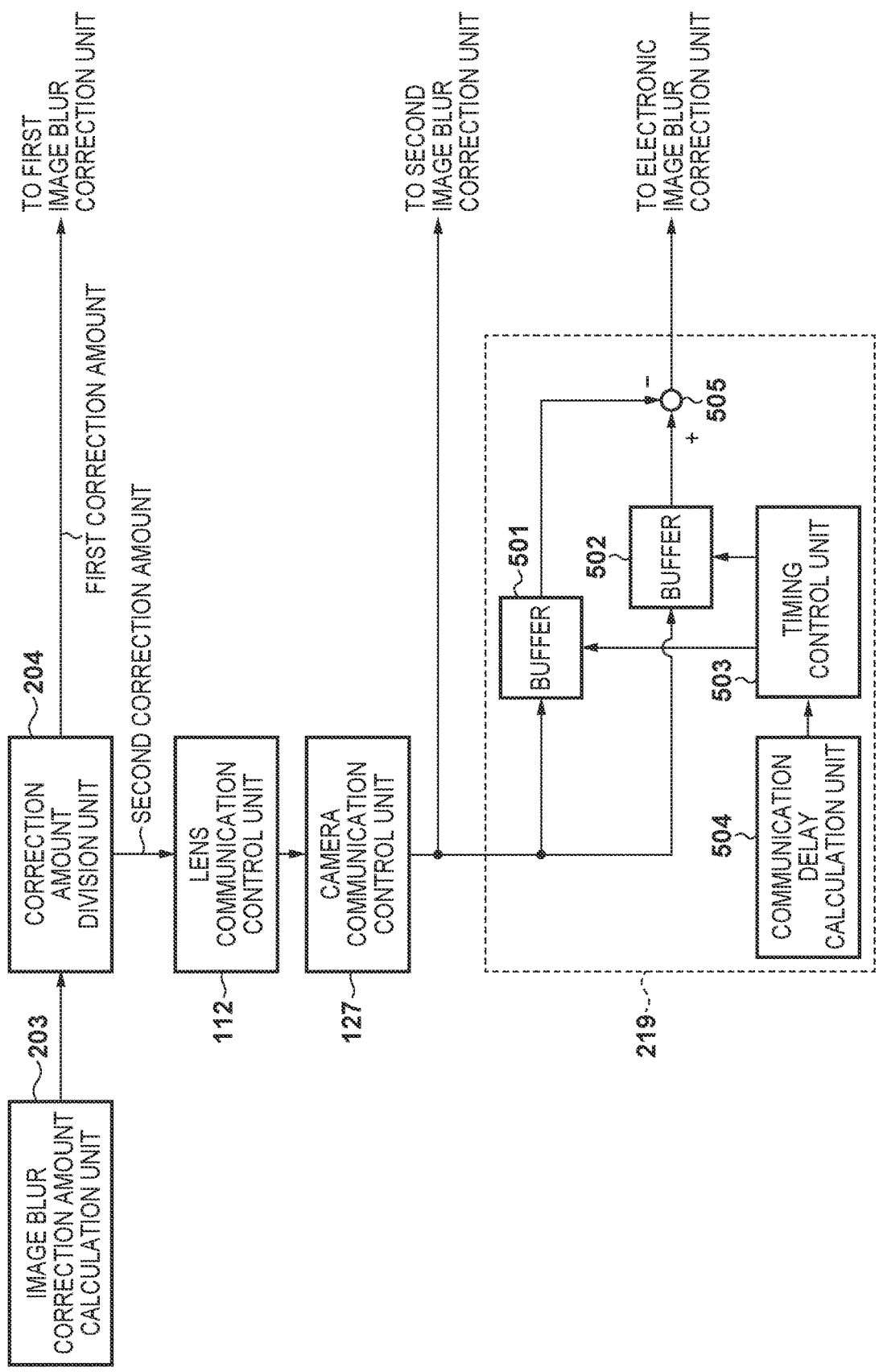
FIG. 5 is a block diagram illustrating a correction error computation unit 219 in detail.

FIG. 5 is a block diagram illustrating the correction error computation unit 219 in detail. The image blur correction amount calculated by the image blur correction amount calculation unit 203 is divided into the first correction amount (master side) and the second correction amount (slave side) in the correction amount division unit 204. The first correction amount is used by the first image blur correction unit 211 provided on the master side, and image blur correction is performed without a delay. The second correction amount is used in image blur correction that is performed by the second image blur correction unit 217 provided on the slave side, with a delay occurring due to the effect of communication via the lens communication control unit 112 and the camera communication control unit 127, and correction remainder occurs. The second correction amount is used in order to perform image blur correction with the second image blur correction unit 217, and is also input to the correction error computation unit 219.

The correction error computation unit 219 calculates the correction remainder that occurs in the moving image due to the correction error of the second image blur correction unit 217, that is, the correction remainder between frames. Since the second correction amount that is used by the second image blur correction unit 217 has a frequency of 1000 Hz, for example, as aforementioned, the correction amount for every frame frequency of a moving image (e.g., 59.94 Hz in the case of a NTSC video signal) needs to be computed from the second correction amount. In view of this, the correction error computation unit 219 derives a representative value of the correction amount in each frame, based on the second correction amount. The representative value is the second correction amount at the time that a frame image is exposed. Also, in the case of using a CMOS image sensor as the image sensor, the exposure timing differs according to the pixel scanning timing, and thus the exposure timing at the center position of the image serves as a reference. Accordingly, the second correction amount in the middle of the exposure period during which the middle of the image is exposed is taken as the correction amount of the current frame image.

A buffer 501 and a buffer 502 are memories for sampling the second correction amount and temporarily holding the sampling result as the correction amount of the current frame. A timing control unit 503 calculates the exposure period based on the shutter speed, and controls the timing for sampling the second correction amount. The timing control unit 503 performs control to sample the original second correction amount which is not delayed (second correction amount corresponding to the image capturing timing of the image to be corrected) in the buffer 501. Also, the timing control unit 503 performs control to sample the delayed second correction amount (second correction amount corresponding to a timing obtained by adding the communication delay to the image capturing timing of the image to be corrected) in the buffer 502, based on the communication delay ΔT calculated by a communication delay calculation unit 504. As the communication delay ΔT, a delay amount measured in advance for every interchangeable lens can be stored in a computer program. Alternatively, ping communication may be performed in the initial communication when the interchangeable lens 100a is mounted to the camera body 100b, and the communication delay ΔT may be calculated from the response time.

As a result of control such as the above, the original second correction amount which is not delayed is held in the buffer 501, and the second correction amount that comes with a communication delay is held in the buffer 502. A subtractor 505 calculates the correction remainder (correction error) that occurs in the moving image due to the communication delay, based on the difference between the original second correction amount and the second correction amount that comes with a communication delay (e.g., by subtracting the original second correction amount from the second correction amount that comes with a communication delay). The calculated correction error is supplied to the electronic correction amount calculation unit 220. The electronic correction amount calculation unit 220 calculates the final correction amount for the electronic image blur correction unit 221 so as to reduce the correction error, and controls the electronic image blur correction unit 221 so as to perform image blur correction electronically (by image processing).

Figure 8:
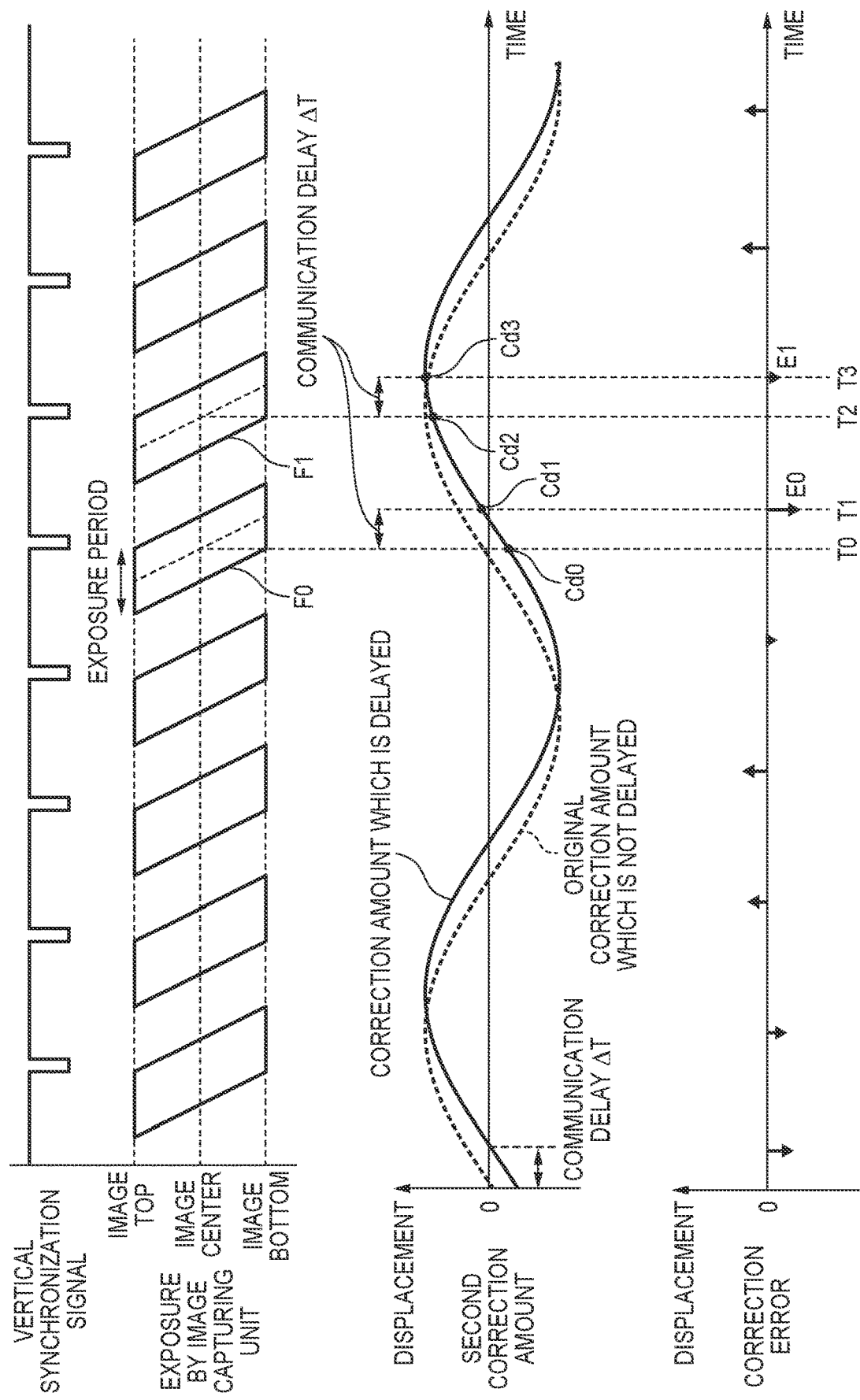
FIG. 8 is a timing chart for describing operations of a timing control unit 503 in detail.

FIG. 8 is a timing chart for describing an operation of the timing control unit 503 in detail. As shown in FIG. 8, exposure control by the image capturing unit 115 is performed in synchronization with a vertical synchronization signal. The image capturing unit 115 is a CMOS image sensor, and performs control for reading out electric charge sequentially from an upper part to a lower part, and thus the operation involves the exposure timing of the lower part of the image being delayed relative to the upper part of the image. As the second correction amount, the original correction amount which is not delayed is shown with a dashed line, and the correction amount in which the phase is delayed due to the effect of the communication delay ΔT is shown with a solid line.

Time T0 of FIG. 8 is the timing for sampling the correction amount corresponding to the image of a frame F0, and is the timing at the middle of the exposure period in the middle of the image of the frame F0. However, the second correction amount is delayed by the communication delay ΔT due to passing via the lens communication control unit 112 and the camera communication control unit 127. The timing control unit 503 performs control to sample a second correction amount Cd0 at time T0 and hold the sampling result in the buffer 502. A second correction amount delayed by communication is thus stored in the buffer 502. Next, at time T1 after the communication delay ΔT has elapsed from time T0, the timing control unit 503 performs control to sample a second correction amount Cd1 and hold the sampling result in the buffer 501. Cd1 is equivalent to the original second correction amount which is not delayed, at the timing (time T0) of the middle of the exposure period in the middle of the image of the frame F0. At time T1, the subtractor 505 then subtracts the correction amount Cd1 stored in the buffer 501 from the correction amount Cd0 stored in the buffer 502, and calculates a correction error E0 for the frame F0.

Similarly with respect to a frame F1, the timing control unit 503, at time T2, samples a second correction amount Cd2 and holds the sampling result in the buffer 502, and, at time T3, samples a second correction amount Cd3 and holds he sampling result in the buffer 501. At time T3, the subtractor 505 then subtracts the correction amount Cd3 stored in the buffer 501 from the correction amount Cd2 stored in the buffer 502, and calculates a correction error El for the frame F1.

Performing similar control on each frame enables the correction error of the second image blur correction unit 217 corresponding to each frame to be calculated. The correction error calculated for every frame is converted into a correction amount of the electronic image blur correction unit 221 in the electronic correction amount calculation unit 220, and image blur correction is performed electronically (by image processing).

Figure 9:
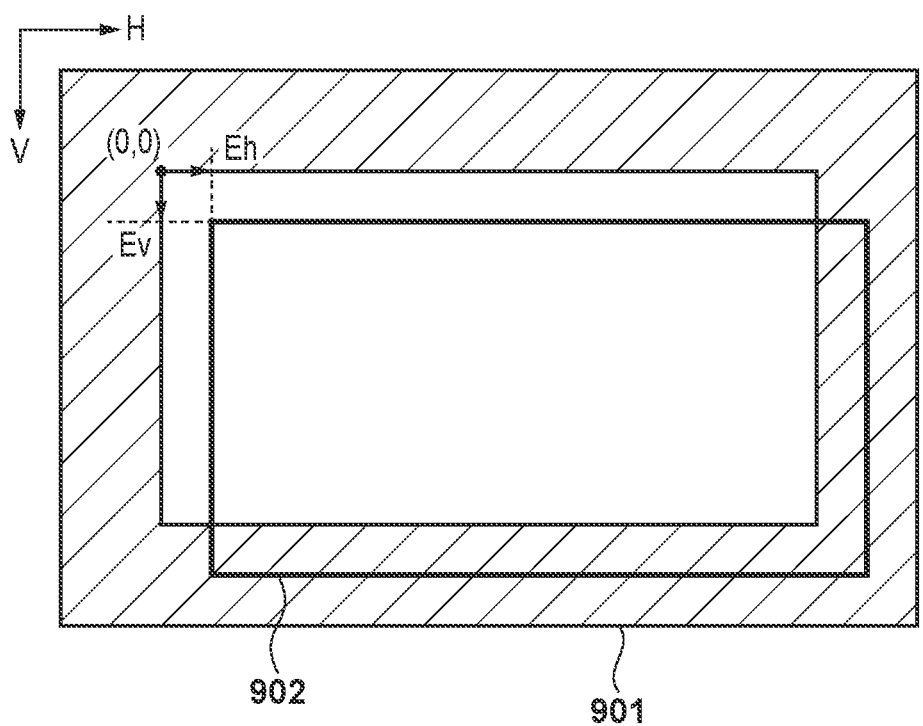
FIG. 9 is a diagram illustrating electronic image blur correction in an image signal processing unit 119.

FIG. 9 is a diagram illustrating electronic image blur correction in the image signal processing unit 119. An image capturing area 901 is the entire area of a frame image (image to be corrected) that has been processed by the image capturing signal processing unit 118 and is stored in the image memory 128. The image signal processing unit 119 corrects horizontal and vertical image blur, by clipping a clipping range 902 from the image capturing area 901 and outputting the clipping range 902. The electronic correction amount calculation unit 220 calculates a horizontal correction amount Eh and a vertical correction amount Ev that are for changing the position of the clipping range 902, based on the correction error calculated by the correction error computation unit 219. That is, the image signal processing unit 119 extracts a different area according to the correction error from the image to be corrected.

Figure 10A:
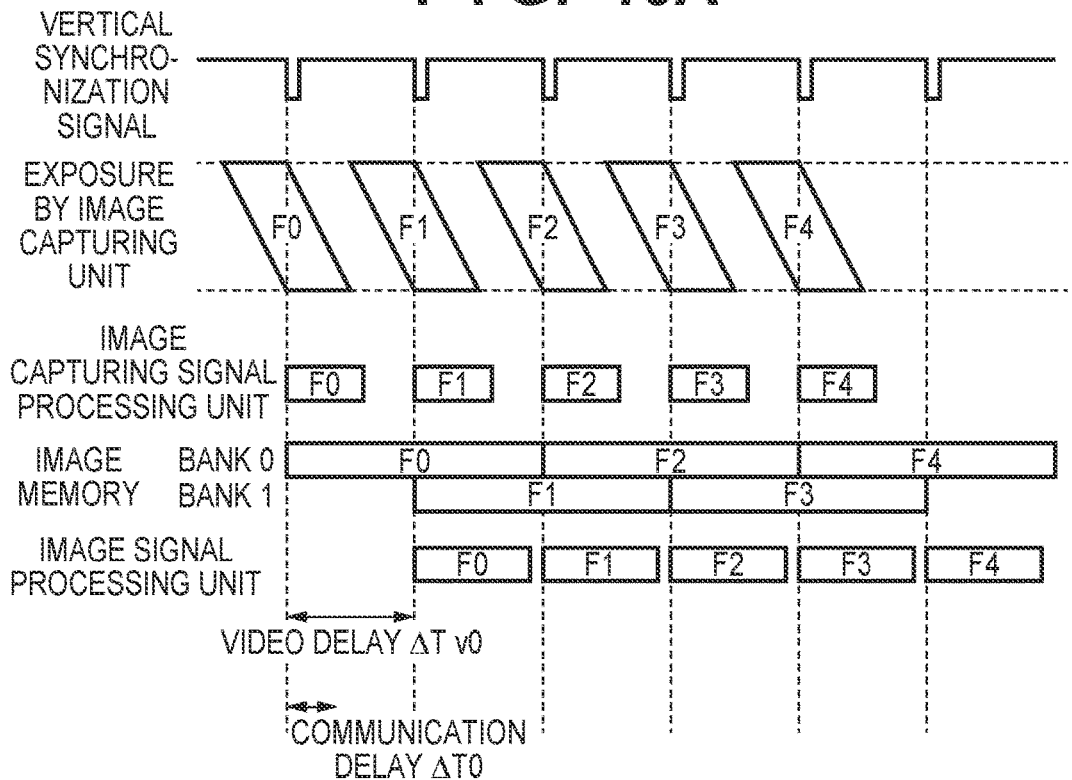
FIGS. 10A and 10B are timing charts illustrating the timing until the image captured by an image capturing unit 115 is processed by the image signal processing unit 119.
Figure 10B:
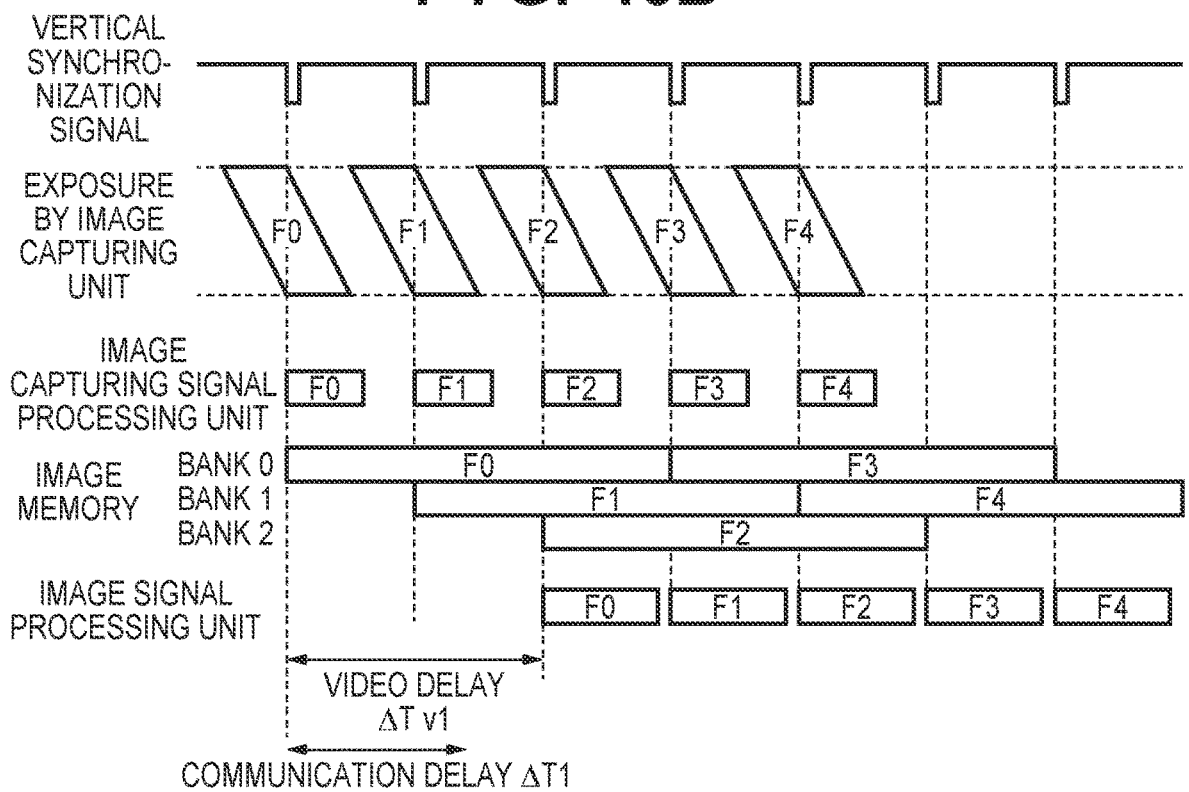

FIGS. 10A and 10B are timing charts illustrating the timing until the image captured by the image capturing unit 115 is processed by the image signal processing unit 119. The image captured by the image capturing unit 115 undergoes signal processing by the image capturing signal processing unit 118, and undergoes electronic image blur correction by the image signal processing unit 119 via the image memory 128. In FIGS. 10A and 10B, signs F0 to F4 are given to the images captured by the image capturing unit 115, and similar signs are also given to the frame images being processed by the image capturing signal processing unit 118 and the image signal processing unit 119.

FIG. 10A shows the case in which the image memory 128 has a two bank configuration, and control for writing images processed by the image capturing signal processing unit 118 alternately to the two banks is performed. As a result, the time period from when image capturing is started by the image capturing unit 115 until when electronic image blur correction is executed by the image signal processing unit 119 will be a video delay ΔTv0 shown in FIG. 10A. Calculation of the correction error and the correction amount in the correction error computation unit 219 and the electronic correction amount calculation unit 220 must be performed within the period of the video delay ΔTv0. Accordingly, a communication delay ΔT0 needs to be ΔT0<ΔTv0. Control is performed such that the banks of the image memory 128 increase as shows in FIG. 10B, and a video delay ΔTv1 increases to greater than the communication delay ΔT1, in the case where the communication delay ΔT is greater than ΔTv0 due to the transmission speed of the lens communication control unit 112 and the camera communication control unit 127. Performing control in this way enables the correction error to be reduced, even in the case where the communication delay ΔT is large.

By controlling the first image blur correction unit 211 and the second image blur correction unit 217 as described above, and calculating the correction error caused by the communication delay of the second correction amount to perform correction with the electronic image blur correction unit 221, it is possible to reduce the effect on moving images that occurs due to the communication delay.

As described above, according to the first embodiment, the interchangeable lens 100a divides the correction amount calculated based on the shake of the image capturing apparatus 100 into the first correction amount and the second correction amount, and transmits the second correction amount to the camera body 100b. The camera body 100b acquires the correction error of the second image blur correction unit 217 of the camera body 100b, based on the communication delay of the second correction amount. The camera body 100b then performs image blur correction electronically (by image processing) with the electronic image blur correction unit 221, based on the correction error. It thereby becomes possible to reduce the correction error caused by the communication delay of the second correction amount in the camera body 100b which corrects image blur using the second correction amount received from the interchangeable lens 100a.

Note that, in the present embodiment, a configuration was described in which the correction amount calculated by the interchangeable lens 100a based on the shake of the image capturing apparatus 100 is divided into the first correction amount and the second correction amount, and image blur correction by the first image blur correction unit 211 is performed using the first correction amount. That is, a configuration was described in which the first image blur correction unit 211 and the second image blur correction unit 217 operate in a coordinated manner so as to share correction of image blur corresponding to shake of the entire apparatus. However, the interchangeable lens 100a need not perform image blur correction. In this case, for example, the interchangeable lens 100a transmits the correction amount calculated based on the shake of the image capturing apparatus 100 to the camera body 100b. Processing similar to the various processing relating to the second correction amount in the above description is then executed by the camera body 100b in relation to the correction amount received from the interchangeable lens 100a.

Second Embodiment

Next, a second embodiment will be described. In the present embodiment, the basic configuration of the image capturing apparatus 100 is similar to the first embodiment (refer to FIG. 1). Hereinafter, the description will mainly focus on the differences from the first embodiment.

In the first embodiment, a configuration was described in which the first image blur correction unit 211 and the second image blur correction unit 217 perform image blur correction in a coordinated manner, by calculating the image blur correction amount of the entire image capturing apparatus using the angular velocity sensor 201 on the interchangeable lens 100a side and dividing the calculated correction amount. On the other hand, in the second embodiment, a configuration will be described in which the correction amount for driving the individual image blur correction units is calculated, using angular velocity sensors provided in both the interchangeable lens 100a and the camera body 100b. In the case of this configuration, overcorrection occurs when the shake information detected by the individual angular velocity sensors is used directly to perform image blur correction, and correct image blur correction cannot be performed. In view of this, the interchangeable lens 100a transmits the image blur correction amount to the camera body 100b, and the camera body 100b subtracts the image blur correction amount of the interchangeable lens 100a from the image blur correction amount calculated in the camera body 100b. The camera body 100b controls the second image blur correction unit 217 based on the correction amount obtained by this subtraction.

Figure 11:
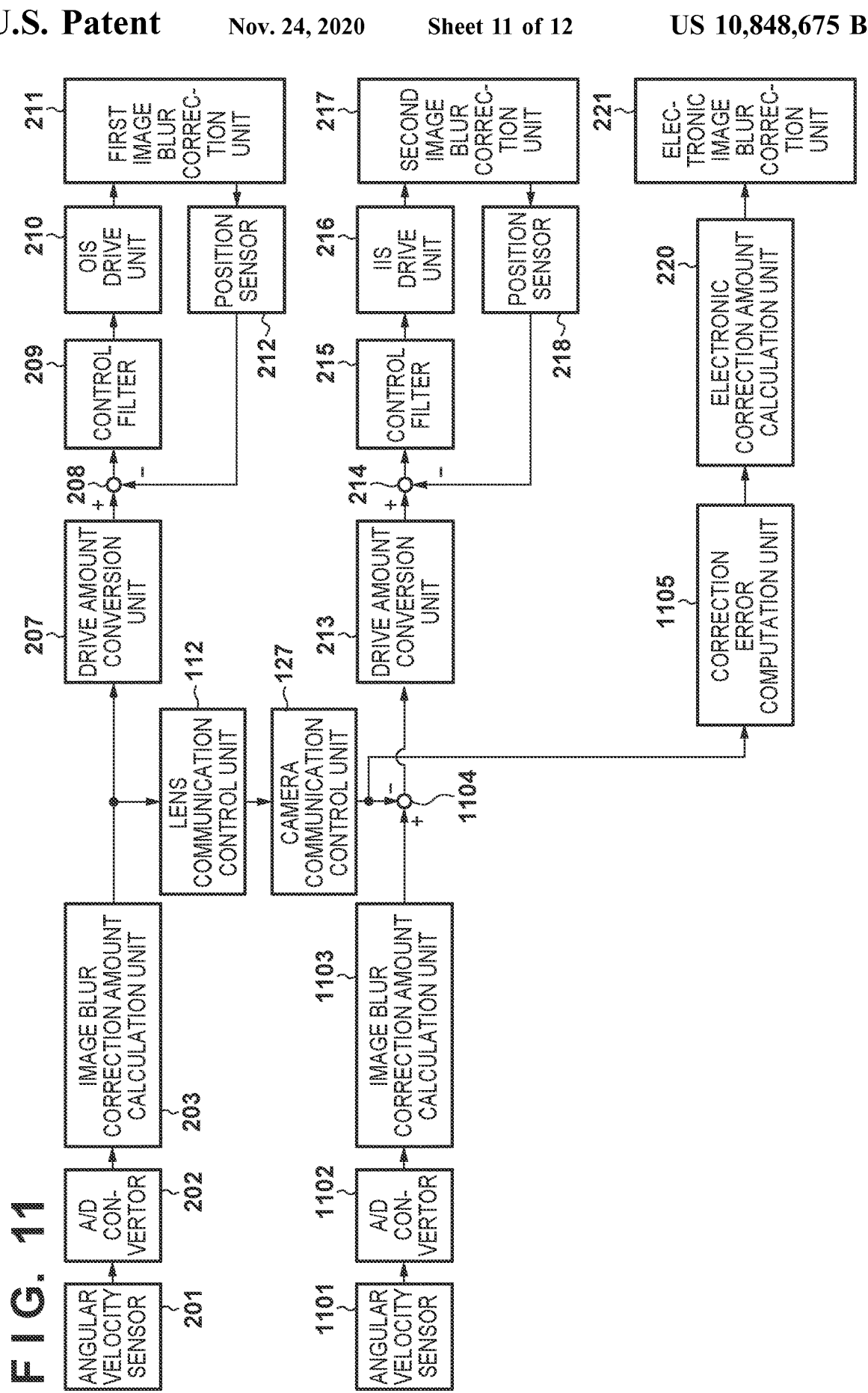
FIG. 11 is a block diagram illustrating image blur correction control according to a second embodiment.

FIG. 11 is a block diagram illustrating image blur correction control according to the second embodiment. In comparison to FIG. 2, the correction amount division unit 204 is omitted, and an angular velocity sensor 1101, an A/D convertor 1102, an image blur correction amount calculation unit 1103 and a subtractor 1104 are added. Also, a correction error computation unit 1105 is provided instead of the correction error computation unit 219.

In FIG. 11, the angular velocity sensor 1101 and the A/D convertor 1102 are included in the camera shake detection unit 124 of the camera body 100b. The image blur correction amount calculation unit 1103, the subtractor 1104 and the correction error computation unit 1105 are implemented by the camera system control unit 126.

The angular velocity sensor 1101 detects the angular velocity of shake that is applied to the camera body 100b, and outputs a voltage that depends on the detected angular velocity. The output voltage of the angular velocity sensor is converted into digital data by the A/D convertor 1102 and acquired as angular velocity data, and the angular velocity data is supplied to the image blur correction amount calculation unit 1103.

The image blur correction amount calculation unit 1103 performs similar processing to the image blur correction amount calculation unit 203 described in the first embodiment. The correction amount that is calculated here is, however, the second correction amount for performing image blur correction with the second image blur correction unit 217, and differs from the processing of the image blur correction amount calculation unit 203 in this respect. Accordingly, in relation to the image blur correction amount calculation unit 1103, a limiter value that is set in the limiter 304 of FIG. 3 is based on the movable range of the second image blur correction unit 217. Note that the image blur correction amount calculation unit 203 on the interchangeable lens 100a side calculates the first correction amount for performing image blur correction with the first image blur correction unit 211, using the angular velocity sensor 201 on the interchangeable lens 100a side.

The subtractor 1104 subtracts the first correction amount received via the lens communication control unit 112 and the camera communication control unit 127 from the second correction amount calculated by the image blur correction amount calculation unit 1103. The output of the subtractor 1104 is converted by the drive amount conversion unit 213 into a drive target value for performing image blur correction with the second image blur correction unit 217. Subtracting the first correction amount of the interchangeable lens 100*a* from the second correction amount of the camera body 100*b* in this way enables appropriate image blur correction to be performed without overcorrecting. Also, the second image blur correction unit 217 acts to correct image blur that was not corrected on the interchangeable lens 100*a* side in cases such as where the movable range of the first image blur correction unit 211 is exceeded. The range over which correction is possible can thereby be expanded.

However, a communication delay arises, since the first correction amount of the interchangeable lens 100*a* that is subtracted by the subtractor 1104 is transmitted via the lens communication control unit 112 and the camera communication control unit 127. Accordingly, phase delay occurs in the first correction amount of the interchangeable lens 100*a* due to the communication delay. As a result, the output of the subtractor 1104 will include a correction error caused by the phase delay of the first correction amount of the interchangeable lens 100*a*.

In view of this, in the present embodiment, the camera body 100*b* calculates the correction error caused by the phase delay of the first correction amount received from the interchangeable lens 100*a*, using the correction error computation unit 1105, and controls the electronic image blur correction unit 221 to cancel out the correction error.

Figure 12:
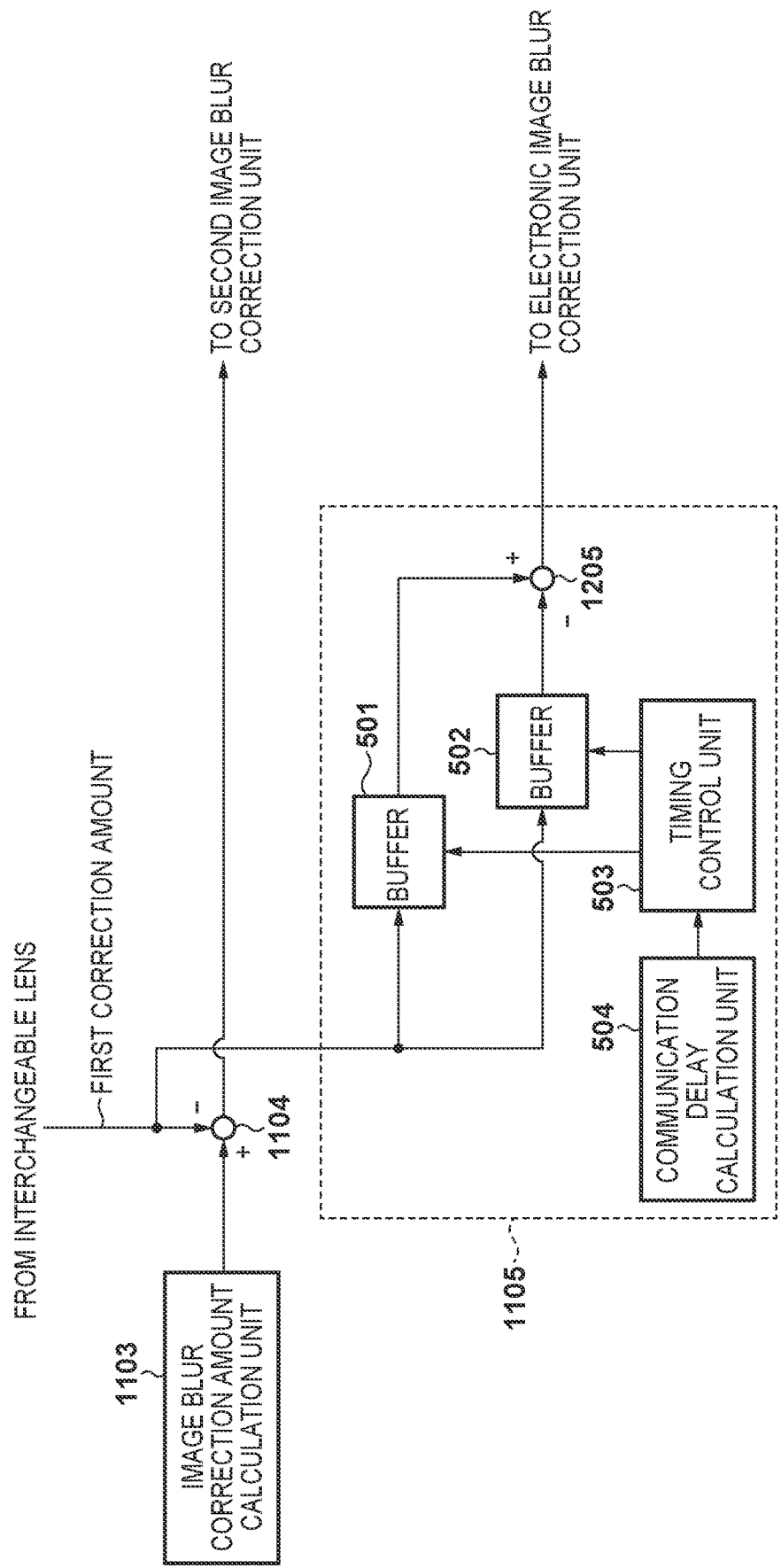
FIG. 12 is a block diagram illustrating a correction error computation unit 1105 in detail.

FIG. 12 is a block diagram illustrating the correction error computation unit 1105 in detail. The image blur correction amount (first correction amount) calculated by the image blur correction amount calculation unit 203 of the interchangeable lens 100*a* is transmitted to the camera body 100*b* via the lens communication control unit 112 and the camera communication control unit 127. In the camera body 100*b*, the first correction amount is supplied to the subtractor 1104, and is also supplied to the correction error computation unit 1105.

The configuration and operations of the correction error computation unit 1105 are almost the same as the configuration and operations of the correction error computation unit 219 described in the first embodiment with reference to FIG. 5, although a subtractor 1205 is provided instead of the subtractor 505. The subtractor 1205 subtracts the first correction amount that is held in the buffer 502 and comes with a communication delay from the original first correction amount that is held in the buffer 501 and is not delayed, and outputs the obtained correction amount as the correction error. The "+" and "−" signs are reversed as compared with the subtractor 505 because the "−" sign in the subtractor 1104 is given to the first correction amount received by the camera body 100*b*. The output of the subtractor 1205 is a signal representing the correction remainder on the slave side. The correction remainder (correction error) thus calculated is supplied to the electronic correction amount calculation unit 220 as the output of the correction error computation unit 1105. The electronic correction amount calculation unit 220 calculates the final correction amount for the electronic image blur correction unit 221 so as to reduce the correction error, and controls the electronic image blur correction unit 221 so as to perform image blur correction electronically (by image processing).

By controlling the first image blur correction unit 211 and the second image blur correction unit 217 as described above, and calculating the correction error caused by the communication delay of the first correction amount to perform correction with the electronic image blur correction unit 221, it becomes possible to reduce the effect on moving images that occurs due to the communication delay.

As described above, according to the second embodiment, the interchangeable lens 100*a* transmits the first correction amount calculated based on the shake of the image capturing apparatus 100 to the camera body 100*b*. The camera body 100*b* acquires the correction error of the second image blur correction unit 217 of the camera body 100*b*, based on the communication delay of the first correction amount. The camera body 100*b* then performs image blur correction electronically (by image processing) with the electronic image blur correction unit 221, based on the correction error. It thereby becomes possible to reduce the correction error caused by the communication delay of the first correction amount in the camera body 100*b* which corrects image blur using the first correction amount received from the interchangeable lens 100*a*.

Note that, in the present embodiment, a system configuration was described in which the first correction amount of the interchangeable lens 100*a* is transmitted to the camera body 100*b*, and the first correction amount is subtracted from the second correction amount calculated by the camera body 100*b*. That is, in the present embodiment, a system configuration was described in which the camera body 100*b* corrects image blur that cannot be corrected by the interchangeable lens 100*a*. However, a system configuration can also be employed in which the second correction amount of the camera body 100*b* is transmitted to the interchangeable lens 100*a*, and the second correction amount is subtracted from the first correction amount calculated by the interchangeable lens 100*a*.

Other Embodiments

The aforementioned embodiments describe configurations for performing shake detection using an angular velocity sensor, but shake detection may be performed using other configurations. For example, a configuration can be employed in which the shake amount is calculated from acceleration using an acceleration sensor or the shake amount of the apparatus is calculated by detecting motion information from image data.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-004466, filed Jan. 15, 2018, which is hereby incorporated by reference herein in its entirety.

What is claimed is:

1. An image blur correction apparatus including a communication device configured to communicate with a correction amount determination apparatus that determines a second correction amount for correcting image blur of an image capturing apparatus based on shake occurring in the image capturing apparatus, the image blur correction apparatus comprising one or more processors and a memory storing a program which, when executed by the one or more processors, causes the image blur correction apparatus to function as:
a reception unit configured to receive the second correction amount from the correction amount determination apparatus via the communication device;
a control unit configured to, based on the second correction amount, control a second correction member configured to correct the image blur;
an acquisition unit configured to acquire a correction error of the second correction member caused by a communication delay of the second correction amount in the communication device; and
a third correction unit configured to, based on the correction error, correct the image blur by image processing to reduce the correction error,
wherein the acquisition unit acquires the correction error, based on a difference between the second correction amount corresponding to an image capturing timing of an image to be corrected and the second correction amount corresponding to a timing obtained by adding the communication delay to the image capturing timing.

2. The image blur correction apparatus according to claim 1,
wherein the image processing includes processing for extracting, from an image to be corrected, an area that differs according to the correction error.

3. The image blur correction apparatus according to claim 1,
wherein the correction amount determination apparatus further determines a first correction amount for correcting the image blur based on the shake, and, based on the first correction amount, controls a first correction member configured to correct the image blur.

4. The image blur correction apparatus according to claim 3,
wherein the first correction member includes a lens movable in a direction perpendicular to an optical axis of the image capturing apparatus.

5. The image blur correction apparatus according to claim 1,
wherein the second correction member includes an image sensor movable in a direction perpendicular to an optical axis of the image capturing apparatus.

6. A camera body comprising:
the image blur correction apparatus according to claim 1; and
the second correction member.

7. An image blur correction method executed by an image blur correction apparatus including a communication device configured to communicate with a correction amount determination apparatus that determines a second correction amount for correcting image blur of an image capturing apparatus based on shake occurring in the image capturing apparatus, the image blur correction method comprising:
receiving the second correction amount from the correction amount determination apparatus via the communication device;
based on the second correction amount, controlling a second correction member configured to correct the image blur;
acquiring a correction error of the second correction member caused by a communication delay of the second correction amount in the communication device; and
based on the correction error, correcting the image blur by image processing to reduce the correction error,
wherein the acquiring step acquires the correction error, based on a difference between the second correction amount corresponding to an image capturing timing of an image to be corrected and the second correction amount corresponding to a timing obtained by adding the communication delay to the image capturing timing.

8. A non-transitory computer-readable storage medium which stores a program for causing an image blur correction apparatus to execute an image blur correction method, the image blur correction apparatus including a communication device configured to communicate with a correction amount determination apparatus that determines a second correction amount for correcting image blur of an image capturing apparatus based on shake occurring in the image capturing apparatus, the image blur correction method comprising:
receiving the second correction amount from the correction amount determination apparatus via the communication device;
based on the second correction amount, controlling a second correction member configured to correct the image blur;
acquiring a correction error of the second correction member caused by a communication delay of the second correction amount in the communication device; and
based on the correction error, correcting the image blur by image processing to reduce the correction error,
wherein the acquiring step acquires the correction error, based on a difference between the second correction amount corresponding to an image capturing timing of an image to be corrected and the second correction amount corresponding to a timing obtained by adding the communication delay to the image capturing timing.

* * * * *